April 13, 1954  LA VERNE G. BOGE  2,674,901
MANUAL OPERATING MEANS FOR TRACTOR BRAKE PEDALS
Filed March 16, 1953
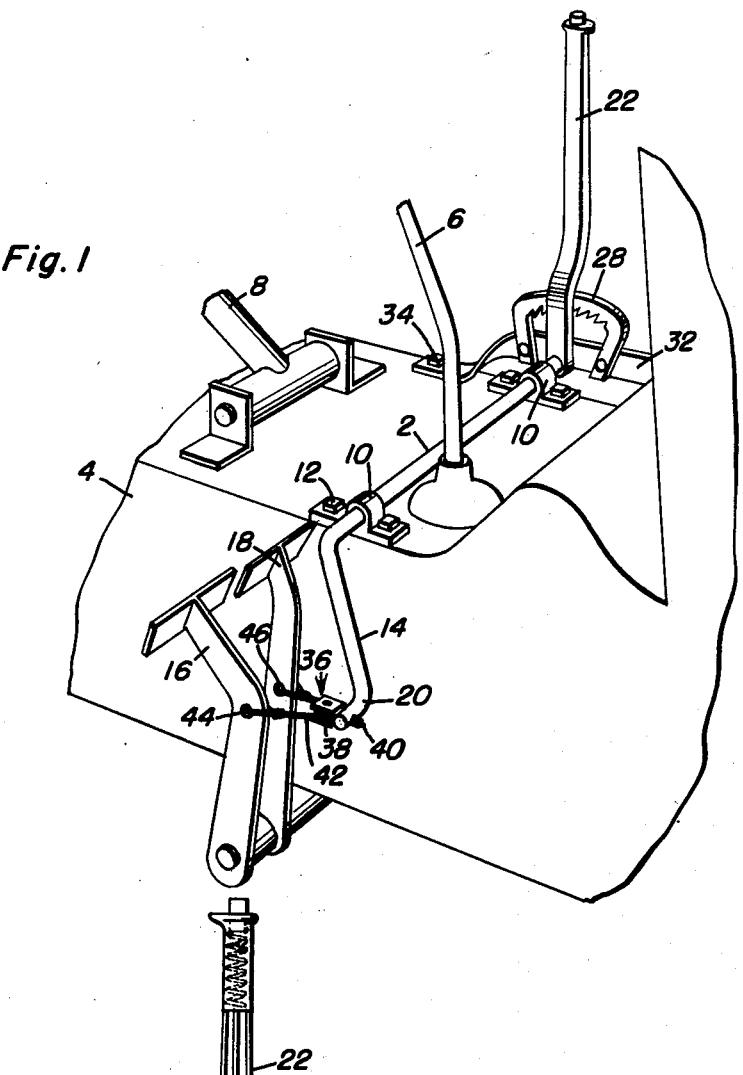
Fig. 1
Fig. 2
La Verne G. Boge
INVENTOR.
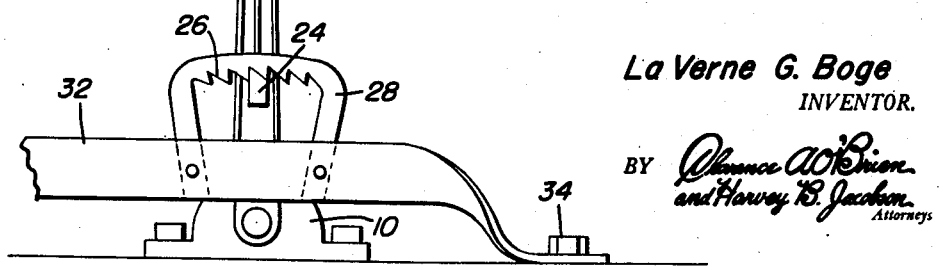

Patented Apr. 13, 1954

2,674,901

UNITED STATES PATENT OFFICE 2,674,901

MANUAL OPERATING MEANS FOR TRACTOR BRAKE PEDALS

La Verne G. Boge, Dyersville, Iowa

Application March 16, 1953, Serial No. 342,640

1 Claim. (Cl. 74—481)

My invention relates to manual operating means for the right and left brake pedals of tractors, and the like.

The primary object of my invention is to provide simply constructed means for manual operating, in unison, and for parking purposes, the right and left brake pedals for opposite brakes of tractors, and the like, and which embodies connections to the pedals for equalizing the operating force exerted against the same.

Another object is to provide means for the above purpose readily attachable to the conventional farm tractor without any alteration in the tractor and which is safe to use and inexpensive to manufacture and install.

Other and subordinate objects, together with the precise nature of my improvements and the advantages thereof will be readily understood when the succeeding description and claim are read with reference to the drawing accompanying and forming part of this specification.

In said drawing:

Figure 1 is a fragmentary view in perspective of my invention in the preferred embodiment thereof installed on a farm tractor and connected to the right and left brake pedals thereof; and Figure 2 is a fragmentary enlarged view in side elevation.

Referring to the drawing by numerals, according to my invention, a brake pedal operating crankshaft 2 is journalled on the top of the drive housing 4 of the tractor between the gear shift lever 6 and seat post 8 in bearings 10 bolted, as at 12, to said housing and in which said shaft 2 extends across the top of said housing 4 for rocking movement.

The crankshaft 2 is provided at the right side of the housing 4 with a depending crank arm 14 in front of the conventional right and left, upstanding, side-by-side brake pedals 16, 18, operative forward and downwardly for applying conventional, separate right and left brakes, not shown, of the tractor. The crank arm 14 is provided with an outturned horizontal terminal 20 for a purpose presently apparent.

An upstanding hand lever 22 at the left side of the housing 4 is suitably fixed on the shaft 2 for rocking rearwardly and forwardly to rock said shaft and rock the crank arm 14 forwardly and rearwardly. As will be readily seen, the crankshaft 14 depends alongside the housing 4 from one end of the rock shaft 2, and the hand lever 22 is on the other end of said shaft.

The hand lever 22 is provided with the conventional, releasable, spring-loaded detent dog 24 engageable with teeth 26 on a detent segment 28 to hold said lever 22 in rearwardly rocked position and the crank arm 14 in forwardly rocked position. The segment 28 is bolted, as as 30, to a bracket bar 32 bolted, as at 34, on top of the housing 4.

The crank arm 14 is operatively connected to the brake pedals 16, 18, by a pull connection 36 whereby rocking of the crank arm 14 forwardly, will operate said pedals forwardly into brake applying position. The pull connection 36 comprises a block and pulley 38 swivelly connected in rearwardly extending position to the terminal 20, as at 40, and a cable 42 trained around the pulley of said pulley and block and having its ends connected, as at 44, 46, to the right and left pedals 16, 18, respectively.

When it is desired to operate the brake pedals 16, 18, for parking purposes, the hand lever 22 is rocked rearwardly. This causes the crank arm 14 to rock forwardly and through the pull connection 36, to pull both brake pedals 16, 18, forwardly, in unison, the cable 42 and the pulley of the connection 38 equalizing the pull against said pedals by the crank arm 14. Upon release of the detent dog 24, the lever 22 may be operated forwardly to cause the crank arm 14 to rock rearwardly so that the brake pedals 16, 18, may assume brake releasing position in the usual well known manner.

The foregoing will, it is believed, suffice to impart a clear understanding of my invention without further explanation.

Manifestly, the invention, as described, is susceptible of modification, without departing from the inventive concept, and right is herein reserved to such modifications as fall within the scope of the appended claim.

What is claimed as new is as follows:

Operating means for a pair of side by side brake pedals on a tractor swingable forwardly into braking position, said means comprising a horizontal rock shaft having a depending crank arm on one end with a horizontal terminal, bearings for said rock shaft attachable to said tractor to support the rock shaft transversely of the tractor forwardly of said pedals with said crank arm in front of said pedals and swingable forwardly of the same by rocking of said shaft in one direction, a trailing block and pulley swivelled on said terminal, a pull cable trained through said block and around said pulley and confined in said block with its ends connected to the pedals of the pair whereby forward swinging of said crank arm will exert a self equalizing and forward pull on both pedals to swing said pedals forwardly, and a hand lever on the other end of said rock shaft for rocking the same.

References Cited in the file of this patent

UNITED STATES PATENTS

| Number | Name | Date |
|---|---|---|
| 489,024 | Miller | Jan. 3, 1893 |
| 922,916 | Krause | May 25, 1909 |
| 2,597,379 | Romel | May 20, 1952 |
| 2,621,535 | Engels et al. | Dec. 16, 1952 |